Oct. 5, 1926.
P. M. HETLAND
1,602,022
ROTARY SHAFT COUPLING
Filed April 3, 1926
Fig. 1.
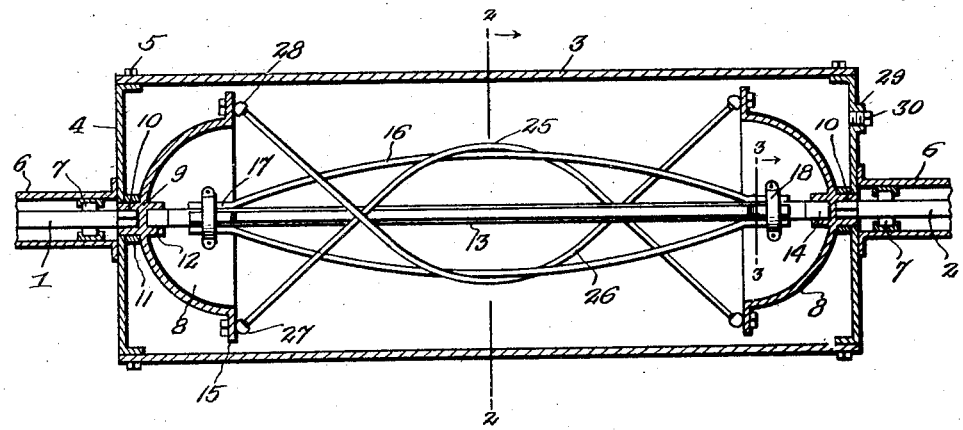
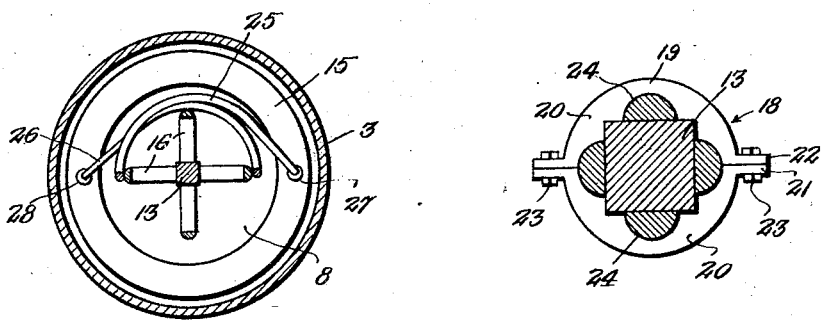
Fig. 2.
Fig. 3.
Inventor
P. M. Hetland,
By Clarence A. O'Brien
Attorney Patented Oct. 5, 1926.

1,602,022

UNITED STATES PATENT OFFICE.

PETER M. HETLAND, OF RADCLIFFE, IOWA.

ROTARY-SHAFT COUPLING.

Application filed April 3, 1926. Serial No. 99,576.

The present invention relates to improvements in rotary shaft couplings and has reference more particularly to a connection between the drive shaft and the driven shaft of a motor.

One of the important objects of the present invention is to provide a rotary shaft coupling which will mitigate the strain upon one or the other of said shafts and which will further compensate for the variations both as to stress and the rate of motion between the drive shaft and the driven shaft.

Another important object of the invention is to provide a rotary shaft coupling which will reduce the strain usually exerted on the shaft, thereby preventing any injury being caused to the shaft or the gearing associated therewith.

A further object is to provide a rotary shaft coupling of the above mentioned character which is simple in construction, inexpensive, strong, and durable, and further well adapted to the purposes for which it is designed.

Other objects and advantages of the invention will become apparent as the nature of the invention will be better understood.

In the accompanying drawing forming a part of this application and in which like numerals designate like parts throughout the several views:

Figure 1 is a view partly in elevation, and partly in section of the shaft coupling embodying my invention.

Figure 2 is a sectional view taken approximately on line 2—2 of Figure 1, and

Figure 3 is a similar section taken on line 3—3 of Figure 1.

In the drawing wherein for the purpose of illustration is shown the preferred embodiment of my invention, the numeral 1 designates the drive shaft which is connected directly or indirectly with some source of power, such as the gasoline engine of an automobile. The driven shaft is designated by the numeral 2. The inner opposed ends of these shafts are disposed in alignment with each other and are further spaced from each other. Furthermore, the inner opposed ends of the shafts are substantially rectangular in cross section as is readily obvious from the construction shown in Figure 1. The purpose of this construction will be presently apparent.

Forming a part of the present invention is a cylindrical casing 3, the same having its respective ends provided with the flanged closures 4, the securing means therefor being shown at 5. The drive shaft and driven shafts are each provided with suitable housings such as is shown at 6 and roller bearings for the respective shafts are arranged in the housing as shown at 7. Each of the end closures 4 for the cylindrical casing 3 is provided with an enlarged central opening through which extends the squared ends of the drive and driven shafts respectively.

A substantially bowl shaped head 8 is provided with the hub 9 the outer end portion of which extends into the central recess formed in each of the end closures 4, it being understood of course that a pair of these substantially bowl shaped heads is provided in connection with the present invention. The outer end portion of the hub 9 is provided with the substantially rectangular shaped socket 10 for receiving the rectangular end of the drive and driven shafts 1 and 2 respectively so that the bowl shaped heads will be carried on the inner opposed ends of the spaced shafts and will furthermore rotate therewith. These bowl shaped heads are spaced from the inner faces of the respective end closures by means of suitable spacing collars shown at 11 in Figure 1.

The inner ends of said hubs of said heads have formed therein the cylindrical socket 12, the purpose of which will be presently apparent. An intermediate connecting shaft 13 is arranged longitudinally within the casing 3 and this shaft is substantially rectangular in cross section, as is more clearly shown in Figure 3 of the drawing. The respective ends of the intermediate connecting shaft 13 are rounded as indicated at 14 and are disposed within the cylindrical socket 12 of the respective hub so that the intermediate shaft is supported in alignment with the drive and driven shafts 1 and 2 respectively, and is further adapted to rotate within the casing between the heads independently thereof.

An annular flange 15 is formed on the open end of the bowl shaped head. Cooperating with the rectangular shaped shaft 13 are the four curved springs 16, the inner faces thereof being flat to coact with the respective sides of the square shape shaft 13, the outer faces of these spring elements being rounded as is more clearly illustrated in Figure 3. The ends of each of the curved or bowed springs 16 are disposed laterally so as to be in engagement with the respective flat sides of the square shaped shaft 13 at all times and furthermore the laterally disposed ends 17 of the curved springs 16 are adapted for slidable movement on the respective side faces of the shaft through the collar 18 which is clamped around the shaft 13 adjacent the respective ends thereof.

This collar 18 comprises the complementary semicircular sections 19 and 20 respectively, the inner opposed faces of which have formed thereon the laterally extending lugs 21 and 22 through which extends the securing bolt 23. In this manner, the collar is adapted to be detachably clamped around the laterally disposed ends of the spring elements 16 as is clearly shown in Figure 3. It is of course understood that the complementary sections 19 and 20 of each of the collars is provided with the cut out portions 24 for receiving the laterally disposed end portions of the spring elements. Normally, the springs 16 are disposed in the manner shown in Figure 1 of the drawing and are therefore in their expanded position.

Cooperating with the springs 16 are the wire cables 25 and 26. The wire cable 25 is attached at its respective ends to the flanged portions 15 of the respective bowl shaped heads 8 at the same side through the medium of the swivel connection 27, and the intermediate portion of this cable extends over the intermediate portion of the spring elements. The other wire cable 26 also has its intermediate portion extending over the springs 16 and the ends of the cable 26 are secured to the flange portions 15 of the respective bowl shaped heads 8 at points diametrically opposite the connection for the respective ends of the wire cable 25 as is clearly shown in Figure 1, and a swivel 28 also affords a means for securing the respective ends of the cable 26 to the flanged portion 15 of the respective heads.

The casing 3 is adapted to be filled with a lubricant and to this end, one of the end closures 4 is provided with a filling opening 29, a screw plug 30 being threaded therein to provide a closure therefor.

Normally the parts are arranged as shown in Figure 1 of the drawing, and when power is first applied to produce the rotation of the drive shaft 1, the bowl shaped head carried on the inner end of this shaft will also rotate therewith and through the medium of either of the cables 25 and 26, depending upon the direction in which the shaft 1 rotates, the other bowl shaped head will be caused to rotate, simultaneously effecting the rotation of the driven shaft 2, and during such movement, the spring elements 16 will be compressed so that the intermediate shaft 13 will be brought into operation, thus producing the simultaneous actuation of the intermediate shaft and the bowl shaped heads as well as the drive and driven shafts respectively.

The provision of a rotary shaft coupling of the above mentioned character will mitigate the strain upon one or the other of said shafts which are associated with the transmission mechanism of an engine and will furthermore compensate for variations both as to stress and the rate of motion between the drive shaft and the driven shaft, thereby overcoming any jerking incident to the actuation of the starting mechanism of the automobile.

While I have shown the preferred embodiment of my invention, it is to be understood that minor changes in the size, shape and arrangement of parts may be resorted to without departing from the spirit of the invention and the scope of the appended claims.

Having thus described the invention, what I claim as new and desire to secure by Letters Patent is:—

1. A rotary shaft coupling of the class described comprising in combination with the drive shaft and a driven shaft arranged in spaced relation with each other, a head carried on the inner end of each shaft and adapted for rotation therewith, an intermediate shaft disposed between the inner opposed ends of the aforementioned shaft, the ends of said intermediate shaft being journaled in the respective heads, means for effecting simultaneous operation of the intermediate shaft and the heads and the drive and driven shafts respectively, said means comprising a plurality of normally expanded spring elements carried by the intermediate shaft, means associated with the opposed heads for contracting the spring elements, said last mentioned means comprising a wire cable having its intermediate portion extending around the spring elements, the ends of the cable being secured to the respective heads.

2. A rotary shaft coupling of the class described comprising in combination with a drive shaft and a driven shaft which are arranged in spaced relation with respect to each other, a pair of bowl shaped heads, a hub associated with each of said heads, the outer end portion of each hub being respectively secured on the inner end of one of said shafts and adapted for rotation therewith, an intermediate shaft having its respective ends journaled in the inner opposed ends of said hubs, a series of normally expanded spring elements carried by the intermediate shaft, and a cable having its intermediate portion wound around the spring element and attached at its respective ends to the respective heads whereby said intermediate shaft will be adapted for simultaneous rotation with the heads and the drive and driven shafts respectively when the spring elements associated with the intermediate shaft are contracted.

In testimony whereof I affix my signature.

PETER M. HETLAND.